United States Patent [19]

Mitsukawa

[11] Patent Number: 4,581,704

[45] Date of Patent: Apr. 8, 1986

[54] GRAIN MIXING SYSTEM

[75] Inventor: Zendo Mitsukawa, Higashihiroshima, Japan

[73] Assignee: Satake Engineering Co., Ltd., Tokyo, Japan

[21] Appl. No.: 559,951

[22] Filed: Dec. 9, 1983

[30] Foreign Application Priority Data

Dec. 11, 1982 [JP] Japan .................................. 57-216267
Jun. 15, 1983 [JP] Japan .................................. 58-108327

[51] Int. Cl.⁴ ...................... G06F 15/46; G05D 11/02
[52] U.S. Cl. ..................................... 364/479; 222/55; 364/567; 366/160
[58] Field of Search ............... 364/468, 469, 478, 479, 364/464, 466, 567; 222/52, 55, 57, 58, 63, 77; 177/25, 60; 366/141, 151, 152, 160, 162, 177, 182

[56] References Cited

U.S. PATENT DOCUMENTS

| | | | |
|---|---|---|---|
| 3,822,056 | 7/1974 | Hawes, Jr. et al. | 366/182 X |
| 4,265,266 | 5/1981 | Kierbow et al. | 222/57 X |
| 4,320,855 | 3/1982 | Ricciardi et al. | 364/479 X |
| 4,345,858 | 8/1982 | Barlow | 222/77 X |
| 4,353,482 | 10/1982 | Tomlinson et al. | 222/55 X |
| 4,498,783 | 2/1985 | Rudolph | 366/177 X |

FOREIGN PATENT DOCUMENTS

1962864  9/1982  Fed. Rep. of Germany .

OTHER PUBLICATIONS

VDI-Nachrichten (News) No. 1—"Automated Transport of Bulk Material"—Jan. 4, 1967, pp. 5 & 6.
VDI-Nachrichten 1964—"Punchcard-Controlled Mixing"—Jul. 29, 1964, pp. 6 & 7.

Primary Examiner—Joseph Ruggiero
Attorney, Agent, or Firm—Henry Sternberg; Bert J. Lewen

[57] ABSTRACT

A system for mixing different kinds of grains comprises a plurality of tanks respectively containing different kinds of grains therein. Each of the tanks has a discharge port. A volumetric weight measuring device measures volumetric weights of the respective grains delivered to the tanks to input the volumetric weight signals to a computer. The computer supplies control signals based on the volumetric weight signals to drive devices for valve devices each of which controls a flow rate of the associated grain discharged from the discharge port of the associated tank. The drive devices are respectively operative in response to the control signals respectively supplied thereto from the computer to respectively drive the valve devices so as to allow the respective grains discharged by the valve devices to be controlled in terms of weight unit. The respective grains discharged by the valve devices are mixed at a mixing station.

17 Claims, 4 Drawing Figures

GRAIN MIXING SYSTEM

BACKGROUND OF THE INVENTION

1. Filed of the Invention

The present invention relates to a system for mixing different kinds of grains.

2. Description of the Prior Art

For example, as disclosed in Japanese Utility Model Application Laid-Open No. 115345/79, a known grain mixing system includes a plurality of tanks respectively containing different kinds of grains, each of the tanks having a discharge port, and a plurality of valves each of which is disposed in communication with the discharge port of the associated tank and variable in opening degree for controlling a flow rate of the grain discharged from the discharge port of the associated tank. The grains are respectively discharged from the tanks through the valves which are adjusted in their respective opening degrees to a ratio identical with a desired mixture ratio, and are mixed with each other. Namely, in the conventional grain mixing system, the mixture ratio is given by the "volume" ratio. Weight of grain having a constant volume is varied depending upon the grain size, surface roughness, amount of moisture content and the like. Accordingly, even if the grains are mixed at a desired "volume" ratio with high acccuracy, the thus mixed grain mixture does not become a mixture mixed at a desired "weight" ratio. In general, since the grains are dealt with in terms of weight on the market, it is desirable that the mixture ratio of the respective grains is given by the weight ratio. However, conventionally, different kinds of grains are mixed at a volume ratio as a mixture ratio by the mixing system as described above, and the thus mixed grain mixture is distributed as if it is mixed at a "weight" ratio.

SUMMARY OF THE INVENTION

An object of the invention is to provide a grain mixing system capable of mixing different kinds of grains at desired weight ratio with high accuracy.

According to the invention, there is provided a grain mixing system for mixig different kinds of grains, comprising a plurality of tanks respectively containing different kinds of grains, each of the tanks having a discharge port, a plurality of valve means each disposed in communication with the discharge port of the associated tank for controlling a flow rate of the associated grain discharged from the discharge port of the associated tank, volumetric weight measuring means for measuring volumetric weights of the grains respectively fed to the tanks to generate volumetric weight signals respectively corresponding to the weights of the respective grains, computer means connected to the volumetric weight measuring means for receiving the respective volumetric weight signals therefrom to generate control signals respectively based on the volumetric weight signals, a plurality of drive means each drivingly connected to the associated valve means and connected to the computer means, the drive means being respectively operative in response to the control signals from the computer means to respectively drive the valve means so as to allow the respective grains discharged by the valve means to be controlled in terms of weight unit, and mixing means for mixing the respective grains discharged from the valve means.

DETAILED DESCRIPTION OF THE PREFERRED EMBODIMENTS

Figure 1:
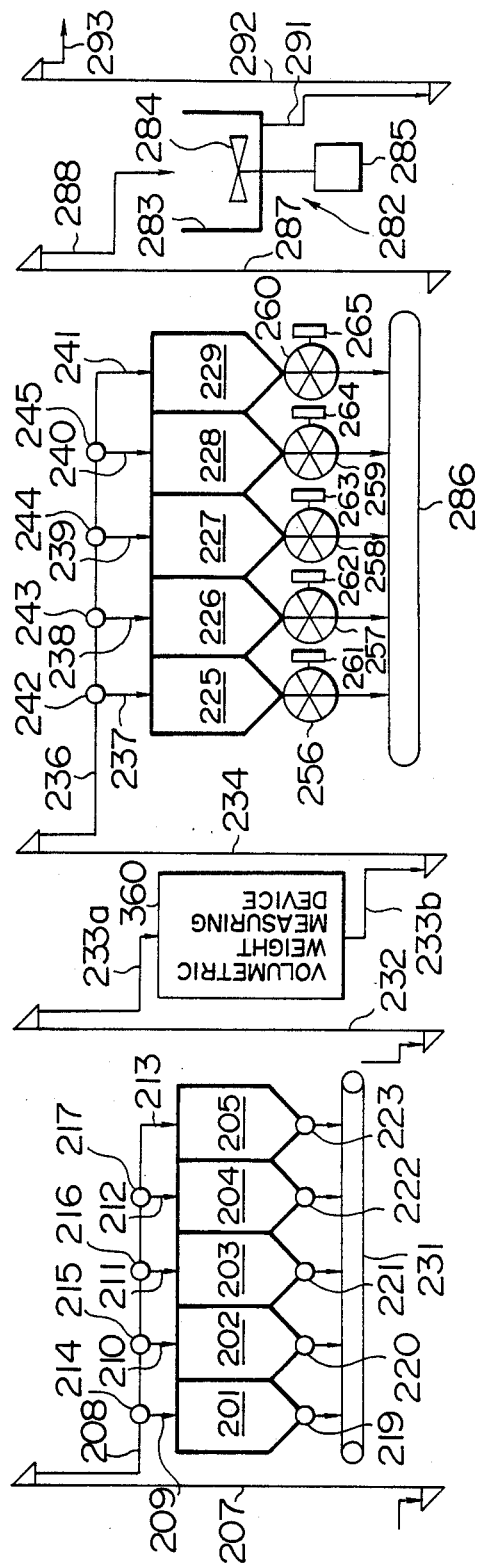
FIG. 1 is a diagrammatic view showing a grain mixing system according to a embodiment of the invention.

Referring now to FIG. 1, a grain mixing system in accordance with first embodiment of the present invention includes a plurality of storage tanks 201 to 205 (five tanks are shown in FIG. 1). A first delivery system for delivering different kinds of grains to the storage tanks 201 to 205, respectively, includes an elevator 207 and a distributing duct 208 connected to the top end of the elevator. The distributing duct 208 includes five branch ducts 209 to 213 connected to the duct 208 and four change-over valves 214 to 217 provided at the connections between the first four branch ducts 209 to 212 and the distributing duct 208, respectively. The tanks 201 to 205 have at their respective bottom discharge ports valves 219 to 223. The grain mixing system also includes mixing preparation tanks 225 to 229 corresponding in number to the storage tanks 201 to 205, and a second deliver system for delivering the grains from the storage tanks to the mixing preparation tanks, respectively. The second delivery system includes a conveyor 231 for delivering the grains discharged from the respective discharge ports of the storage tanks 201 to 205, an elevator 232 having a bottom thereof communicating with a downstream end of the conveyor 231, a duct 233a having an upstream end thereof connected to a top of the elevator 232, a duct 233b having an upstream end thereof communicatable with a downstream end of the duct 233a, an elevator 234 having a lower and thereof communicating with a downstream end of the duct 233b, a distributing duct 236 connected to a top of the elevator 234, branch ducts 237 to 241 connected to the distributing duct 236, and four change-over valves 242 to 245 provided at the connections between the first four branch ducts 237 to 240 and the distributing duct 236, respectively. The volumetric weight measuring device 360 is connected to the downstream end of the duct 233a and to the upstream end of the duct 233b for measuring the weights per unit volume, i.e., volumetric weights of the respective grains delivered through the ducts 233a and 233b. The volumetric weight measuring device 360 is disclosed in my copending application Ser. No. 554,783 filed on Nov. 25, 1983, entitled "Grain Handling System", U.S. Pat. No. 4,544,280. The disclosure of the copending application is hereby incorporated by reference into the present application.

The discharge ports of the mixing preparation tanks 225–229 are in communication with rotary valves 256–260, respectively. The rotary valves 256–260 are driven by pulse motors 261–265, respectively. The structure of each of the rotary valves 256–260 and the associated pulse motor 261–265 are disclosed in the above-noted copending application which should be referred to.

The grain mixing system includes a mixing station 282, a third delivery system for delivering the grains discharged out of the mixing preparation tanks 225 to 229 to the mixing station, and a fourth delivery system for delivering the grains mixed at the mixing station 282 to a desired location. The mixing station 282 includes a mixing tank 283, an agitating vane assembly 284 for agitating and mixing the grains fed into the mixing tank, and a motor 285 for drivingly rotating the agitating vane assembly. The third delivery system includes a conveyor 286 for delivering the grains respectively discharged through the rotary valves 256 to 260, an elevator 287 having a lower end thereof communicating with a downstream end of the conveyor 286, and a duct 288 having a downstream end thereof communicating with a top of the mixing tank 283 and an upstream end connected to a top of the elevator 287. The fourth delivery system includes a duct 291 having an upstream end thereof connected to a bottom of the mixing tank 283, an elevator 292 having a lower end thereof connected to a downstream end of the duct 291, and a duct 293 having an upstream end thereof connected to a top of the elevator 292 for delivery the mixed grains to a desired location.

Figure 2:
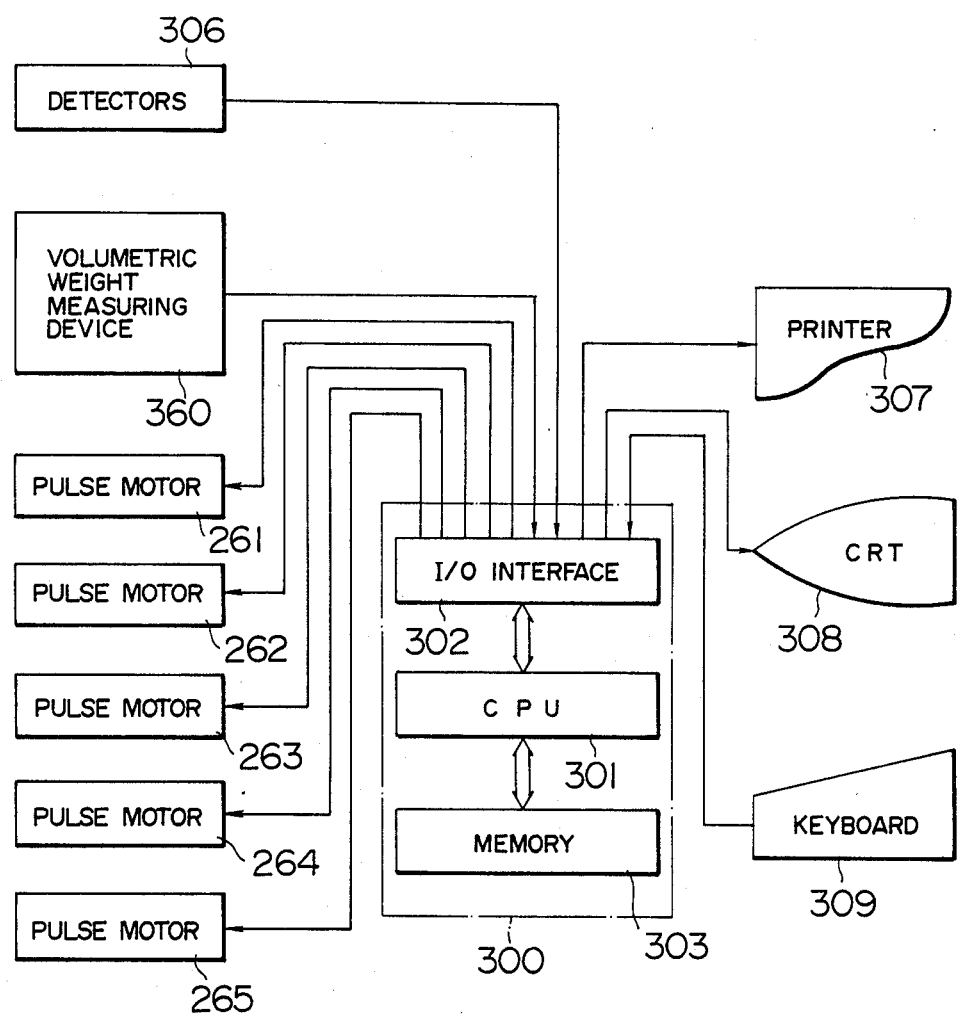
FIG. 2 is a block diagram of a control system incorporated in the embodiment shown in FIG. 1.

Referring now to FIG. 2, the control system incorporated in the grain mixing system shown in FIG. 1 includes a mircrocomputer 300 having a CPU (Central Processing Unit) 301, an I/O interface (INPUT/OUTPUT INTERFACE) 302 connected to the CPU, and a memory 303 connected to the CPU. The pulse motors 261 to 265 connected to the rotary valves 256 to 260, respectively, are connected to the I/O interface 302. The volumetric weight measuring device 360 measures the volumetric weights of the respective grains delivered through the ducts 233a and 233b to supply to the CPU 301 through the I/O interface 302 signals representative of the volumetric weights of the respective grains. The keyboard 309 is connected to the I/O interface in order to input any desired set values to the CPU 301. A CRT (Cathode-ray Tube) 308 is connected to the I/O interface in order to display data processed in the CPU 301 and a printer 307 is connected to the I/O interface to print out the data, if desired. Various detectors 306 are connected to the I/O interface 302 to detect break-down or fault of the system, an operational condition at the subsequent working station and the like so as to supply stop signals to the CPU.

Referring now to FIGS. 1 and 2, the operation of the grain mixing system will be described. A first kind of grain delivered by the elevator 207 is fed to the first storage tank 201, with the discharge port of the first storage tank 201 being closed by the valve 219 and ony the duct 208 and the branch duct 209 being allowed to communicate with each other by the change-over valve 214. Thereafter, the change-over valve 214 is moved into a position where the communication between the duct 208 and the branch duct 209 is interrupted and the duct 208 and the change-over valve 215 communicate with each other. With the valve 220 closing the discharge port of the second tank 202 and the change-over valve 215 allowing only the duct 208 and the branch duct 210 to communicate with each other, a second kind of grain delivered by the elevator 207 is fed to the second storage tank 202. Similarly, third, fourth and fifth kinds of ggains are fed to the third, fourth and firth storage tanks 203, 204 ad 205, respectively.

Subsequently, the conveyor 231 and the elevators 232 and 234 are operated. The change-over valve 242 is actuated to the position where the duct 236 and the branch duct 237 only are communicated with each other. The valve 219 is actuated to open the discharge port of the storage tank 201. The first kind of grain within the first storage tank 201 is discharged through the discharge port thereof onto the conveyor 231. The first kind of grain is delivered to the first mixing preparation tank 225 through the conveyor 231, elevator 232, ducts 233a and 233b, elevator 234, duct 236 and branch duct 237. Then, the discharge port of the first storage tank 201 is closed by the valve 219, and the change-over valve 242 is moved into such position as to interrupt the communication between the duct 236 and the branch duct 237 and to allow the duct 236 and the change-over vlave 243 to communicate with each other. Then, the discharge port of the second storage tank 202 is opened by the valve 220. Also, the change-over valve 243 is moved into such position as to allow the duct 236 and the branch duct 238 to communication with each other. The second kind of grain within the second storage tank 202 is discharged onto the conveyor 231 through the discharge port of the tank 202. The second kind of grain is delivered to the second mixing preparation tank 226 through the conveyor 231, elevator 232, ducts 233a and 233b, elevator 234, duct 236 and the branch duct 238. Similarly, the third, fourth and fifth kinds of grains are delivered from the third, fourth and fifth storage tanks 203, 204 to the third, fourth and fifth mixing preparation tank 227, 228 and 229, respectively.

In a first operational mode, the keyboard 309 inputs to the computer 300 the calendar date and set values of a total weight $W_O$ Kg and a mixture ratio (a:b:c:d:e) of the first through fifth kinds of grains to be respectively discharged by the rotary valves 256-260. The volumetric weight measuring device 360 measures the volumetric weight $Wv_1$ Kg/m³ of the first kind of grain fed from the first storage tank 201 to the first mixing preparation tank 225, the volumetric weight $Wv_2$ Kg/m³ of the second kind of grain fed to the second storage tank 202 to the secod mixing preparation tank 226, the volumetric weigh $Wv_3$ Kg/m³ of the third kind of grain fed from the third storage tank 203 to the third mixng preparation tank 227, the volumetric weight $Wv_4$ Kg/m³ of the fourth kind of graid fed from the fourth storage tank 204 to the fourth mixing preparation tank 228 and the volumetric weight $Wv_5$ Kg/m³ of the fifth kind of grain fed from the fifth storage tank 205 to the fifth mixing preparation tank 229. The volumetric weight measuring device 360 supplies to the CPU 301 signals representative of the volumetric weights $Wv_1$ to $Wv_5$ of the measured respective grains. The CPU 301 calculates the respective total numbers of revolution $N_1$ to $N_5$ of the rotary valves 256 to 260 on the basis of the set total weight value $W_O$ and the set mixture ratio (a:b:c:d:e) from the keyboard 309 and the volumetric weight signals $Wv_1$ to $Wv_5$ from the volumetric measuring device 360 in accordance with the following equations.

$$\begin{aligned}N_1 &= a \cdot W_O/\{(a + b + c + d + e) \cdot Wv_1 \cdot V\} \\ N_2 &= b \cdot W_O/\{(a + b + c + d + e) \cdot Wv_2 \cdot V\} \\ N_3 &= c \cdot W_O/\{(a + b + c + d + e) \cdot Wv_3 \cdot V\} \\ N_4 &= d \cdot W_O/\{(a + b + c + d + e) \cdot Wv_4 \cdot V\} \\ N_5 &= e \cdot W_O/\{(a + b + c + d + e) \cdot Wv_5 \cdot V\}\end{aligned} \quad (1)$$

where V is a discharge volume (m³) per one revolution of each of the rotary valves 256 to 260.

The CPU 301 performs the calculations in accordance with above equations (1) and sets the respective total numbers of revolution $N_1$ to $N_5$ of the rotary valves 256 to 260. The CPU 301 supplies "ON" signals to the respective pulse motors 261 to 265 to cause the same to respectively drive te rotary valves 256 to 260 such that the rotary valves are rotated by the respective numbers of revolution set and calculated by the CPU 301. The entire grains respectively discharged by the rotary valves 256 to 260 are delivered to the mixing tank 283 through the conveyor 286, elevator 287 and duct 288, and agitated and mixed by the agitating vane assembly 284. The thus mixed grains are delivered to a desired location through the duct 291, elevator 292 and duct 293.

The data including the respective total numbers of revolution $N_1$ to $N_5$ set and calculated by the CPU 301, the set total dischage weight Wo and the set mixure ratio (a:b:c:d:e) from the keybard 309 and the volumetric weights $Wv_1$ to $Wv_5$ of the respective grains measured by the volumetric weight measuring device 360 are stored in the memory 303, and are displayed by the CRT 308 and printed out by the printer 307, if desired.

In a second operational mode, the keyboard 309 inputs to the computer 300 the calendar date and respective set weight values per unit time of the first to fifth kinds of grains respectively to be discharged through the rotary valves 256 to 260. Namely, the ratio of the set weight values of the respective grains conforms to the mixture ratio. The volumetric weight measuring device 360 supplies the respective volumetric weight signals to the CPU 301 in the same manner as that described with reference to the "first operational mode". The CPU 301 processes these volumetric weight signals and the set signals from the keyboard 309 and calculates the respective numbers of revolution per unit time of the rotary valves 256 to 260. Namely, assuming that the respective set weight values per unit time of the grains respectively discharged from the rotary valves 256 to 260 are $Ws_{11}$ Kg/sec, $Ws_{12}$ Kg/sec, $Ws_{13}$ Kg/sec, $Ws_{14}$ Kg/sec and $Ws_{15}$ Kg/sec, the grain discharge volume per one revolution of each of the rotary valves 256 to 260 is V m$^3$, and the volumetric weights of the respective grains measured by the volumetric weight measuring devices 360 are $Wv_{11}$ Kg/m$^3$, $Wv_{12}$ Kg/m$^3$, $Wv_{13}$ Kg/m$^3$, $Wv_{14}$ Kg/m$^3$ and $Wv_{15}$ Kg/m$^3$, respective numbers of revolution per unit time $N_{11}$ to $N_{15}$ of the rotary valves 256 to 260 are given as follows.

$$\left.\begin{array}{l} N_{11} = Ws_{11}/(Wv_{11} \cdot V) \\ N_{12} = Ws_{12}/(Wv_{12} \cdot V) \\ N_{13} = Ws_{13}/(Wv_{13} \cdot V) \\ N_{14} = Ws_{14}/(Wv_{14} \cdot V) \\ N_{15} = Ws_{15}/(Wv_{15} \cdot V) \end{array}\right\} \quad (2)$$

The CPU 301 performs the calculations in accordance with the above equation (2) and sets the numbers of revolution per unit time $N_{11}$ to $N_{15}$ of the respective rotary valves 256 to 260. The CPU 301 supplies "ON" signals sbsequently to the respective pulse motors 261 to 265 with a predetermined time lag to cause the pulse motors to drive the rotary valves 256 to 260 with the predetermined tme lag such that the rotary valves are rotated at the respective numbers of revolution per unit time $N_{11}$ to $N_{15}$ set and calculated in accordance with the above equations (2) by the CPU 301 and such that the grains respectively discharged by the rotary valves 256 to 260 and conveyed by the conveyor 286 reach the bottom of the elevator 287 at the same time. More particularly, the first rotary valve 256 is first rotated to discharge the first kind of grain from the first mixing preparation tank 225 onto the conveyor 286. When the first kind of grain conveyed by the conveyor 286 is advanced to a location just before a location just below the second rotary valve 257, the second rotary valve is rotated to discharge the second kind of grain frm the second mixing preparation tank 226 onto the conveyor 286. When the first and second kinds of grains are advanced to a location just before a location just below the third rotary valve 258, the third rotary valve is rotated to discharge the third kind of grain from the third mixing preparation tank 227 onto the conveyor 286. When the first to third kinds of grains are advanced to a location just before a location just below the fourth rotary valve 259, the fourth rotary valve is rotated to discharge the fourth kind of grain from the fourth mixing preparation tank 228 onto the conveyor 286. When the first to fourth kinds of grains are advanced to a location just before a location just below the fifth rotary valve 265, the fifth rotary valve is rotated to discharge the fifth kind of grain from the fifth mixing preparation tank 229 onto the conveyor 286. Thus, the first to fifth kinds of grains respectively discharged from the first to fifth mixing preparation tanks 225 to 229 reach the bottom of the elevator 287 at the same time. The predetermined time lag is suitably set by a timer or the like dependent upon the moving velocity of the comveyor 286. The grains respectively discharged from the rotary valves 256 to 260 are continuously delivered through the conveyor 286, elevator 287 and duct 288 to the mixing tank 283, are mixed and agitated by the agitating vane assembly 284 and are delivered to a desired location through the duct 291, elevator 292 and the duct 293.

The data including the numbers of revolution per unit time $N_{11}$ to $N_{15}$ set and calculated by the CPU 301, the respective set weight values per unit time $Ws_{11}$ to $Ws_{15}$ Kg/sec from the key board 309, the volumetric weights $Wv_{11}$ to $Wv_{15}$ of the respective grains measured by the volumetric weight measuring device 360 and the total discharge weight $W_{01}$ (Kg) are stored in the memory 303, and are displayed on the CRT 308 and printed out by the printer 307, if desired. The CPU 301 may receive signals each indicating how many times the associated rotary valve 256 to 260 has been rotated and may calculate the total discharge weight $W_{01}$ Kg of the grain mixture in accordance with the signals.

Figure 3:
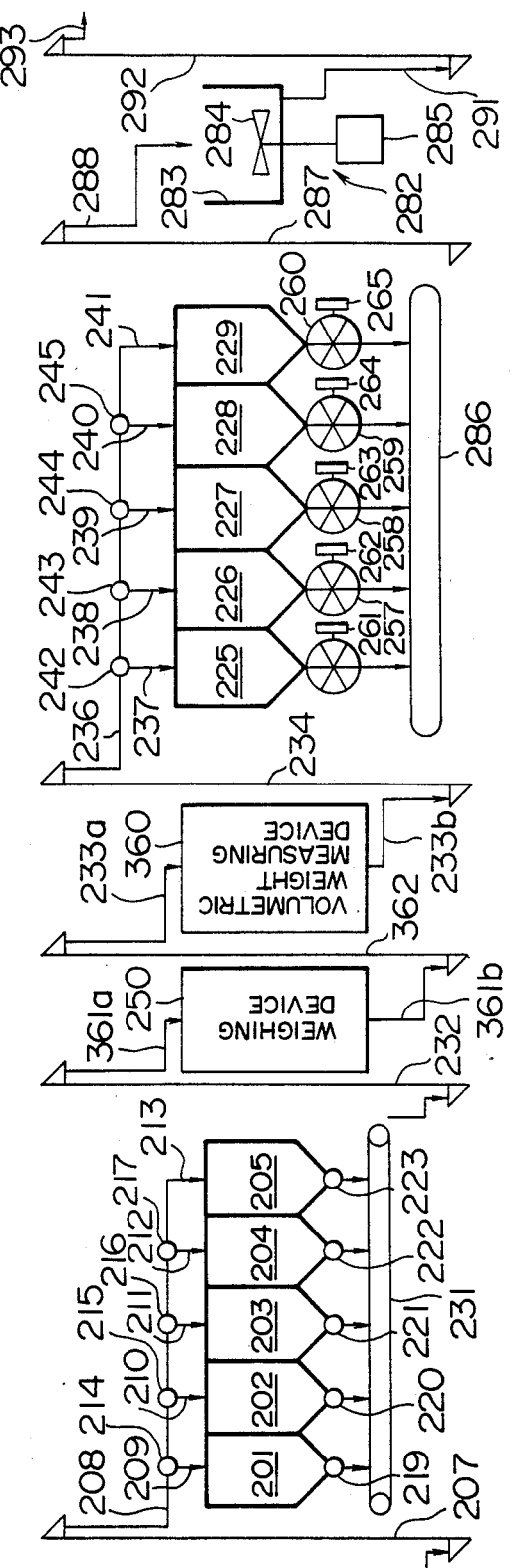
FIG. 3 is a diagrammatic view showing a grain mixing system according to another embodiment of the invention.
Figure 4:
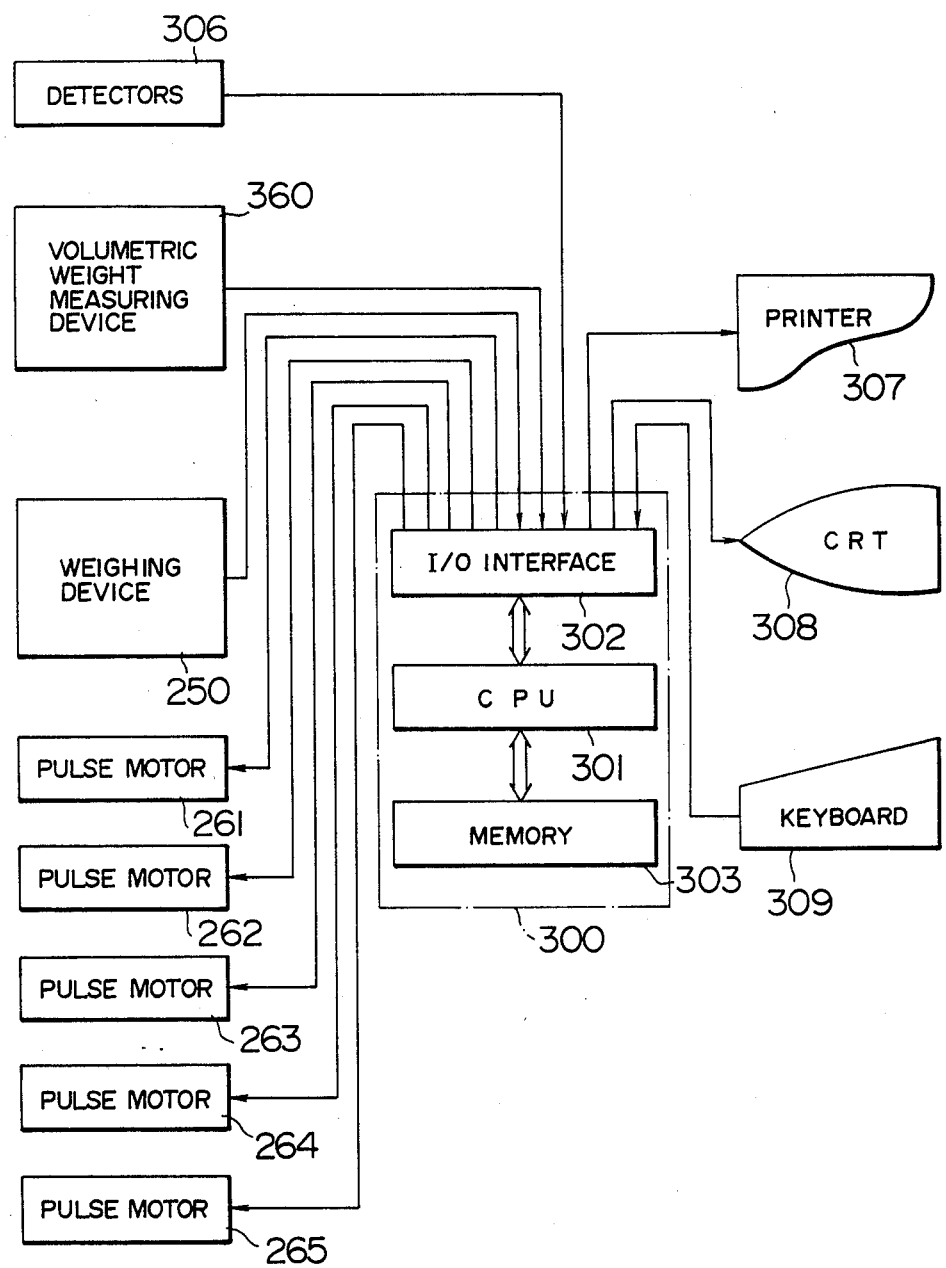
FIG. 4 is a block diagram of a control system incorporated in the embodiment shown in FIG. 3.

FIGS. 3 and 4 show a grain mixing system in accordance with a second embodiment of the invention. In FIGS. 3 and 4, components or members identical in construction and function with those shown in FIGS. 1 and 2 are indicated by the same reference characters, and the description of such components or member will be omitted for simplification.

In addition to the components or members shown in FIGS. 1 and 2, the second embodiments includes a duct 361a having an upstream end theeof connected to the top of the elevator 232, a weighing device 250 connected to a downstream end of the duct 361a, a duct 361b having an upstream end thereof connected to the weighing device 250 and an elevator 362 having a lower end thereof communicating with a downstream end of the duct 361b and a top end connected to the upstream end of the duct 233a. The weighing device 250 measures the weights of the respective grains delivered through the ducts 361a and 361b to input signals representative of the weights of the respective grains to the CPU 301 of the computer 300. The weighing device 250 may be a weighing device disclosed in the U.S. Pat. No. 3,966,000 or a weighing device which is known to one skilled in the art as a "hopper scale".

The operation of the grain mixing system according to the second embodiment will now be described. The weighing device 250 measures the weight $W_{21}$ Kg of the first kind of grain fed from the first storage tank 201 to the first mixing preparation tank 225, the weight $W_{22}$ Kg of the second kind of grain fed from the second storage tank 202 to the second mixing preparation tank 226, the weight $W_{23}$ Kg of the third kind of grain fed from the third storage tank 203 to the third mixing preparation tank 227, the weight $W_{24}$ Kg of the fourth kind of grain fed from the fourth storage tank 204 to the fourth mixing preparation tank 228 and the weight $W_{25}$ Kg of the fifth kind of grain fed from the fifth storage tank 205 to the fifth mixing preparation tank 229. The weighing device 250 supplies to the CPU 301 signals representative of the weights of the respective grains. The respective total numbers of revolution $N_{21}$ to $N_{25}$ of the rotary valves 256 to 260, required for discharging the entire grains respectively contained in the mixing preparation tanks 225 to 229 are given as follows.

$$\left.\begin{array}{l} N_{21} = W_{21}/(Wv_{21} \cdot V) \\ N_{22} = W_{22}/(Wv_{22} \cdot V) \\ N_{23} = W_{23}/(Wv_{23} \cdot V) \\ N_{24} = W_{24}/(Wv_{24} \cdot V) \\ N_{25} = W_{25}/(Wv_{25} \cdot V) \end{array}\right\} \quad (2)$$

where $Wv_{21}$ to $Wv_{25}$ are the volumetric weights (Kg/m$^3$) of the respective grains measured by the volumetric measuring device 360, and V is a discharge volume (m$^3$) per one revolution of each of the rotary valves 256 to 260.

The CPU 301 performs the calculations in accordance with the above equations (3) and sets the total numbers of revolution $N_{21}$ to $N_{25}$ of the rotary valves 256 to 260. The CPU 301 supplies "ON" signals subsequently to the respective pulse motors 261 to 265 with a predetermined time lag to cause the pulse motors to drive the rotary valves 256 to 260 with the predetermined time lag such that the rotary valves are rotated within the respective time durations which are the same as each other and by the respective total numbers of revolution $N_{21}$ to $N_{25}$ set and calculated in accordance with the above equations (3) by the CPU and such that the grains respectively discharged by the rotary valves 256 to 260 and conveyed by the conveyor 286 reach the bottom of the elevator 287 at the same time in the same manner as described with reference to the "second operational mode" of the first embodiment. The time duration are calculated and determined in accordance with the capacity of the rotary valves by the CPU 301. Thus, the first through fifth kinds of grains are discharged from the first through fifth mixing preparation tanks 225 to 229 by the rotary valves 256 to 260 with the predetermined time lag. The grains discharged from the rotary valves 256 to 260 are continuously delivered to the mixing tanks 283 through the conveyor 286, elevator 287 and duct 288, are mixed and agitated by the agitating vane assembly 284 and are delivered to a desired location through the duct 291, the elevator 292 and the duct 293.

The data including the total numbers of revolution $N_{21}$ to $N_{25}$ set and calculated by the CPU 301, the weights $W_{21}$ to $W_{25}$ Kg of the respective grains measured by the weighing device 250, the volumetric weights $Wv_{21}$ to $Wv_{25}$ Kg/m$^3$ of the respective grains measured by the volumetric weight measuring device 360 and the total discharge weigh $W_{21}+W_{22}+W_{23}+W_{24}+W_{25}$ (Kg) are sorted in the memory 303, and are indicated on the CRT 308 and printed out by the printer 307, if desired.

In the second embodiment of the grain mixing system, since the time durations between the start and the completion of the discharging of the respective grains from the mixing preparation tanks 225 to 229 are the same as each other, it is possible to obtain grain mixture mixed in more uniform manner.

Although the above described embodiments have been discribed as having the rotary valves 256-260, valve assemblies each having two slide valve members spaced in the vertical direction may be uesd in place of the rotary valves.

What is claim is:

1. A grain mixing system for mixing different kinds of grains, comprising:
   a plurality of tanks respectively containing different kinds of grains, each of said tanks having a discharge port;
   a plurality of valve means each disposed in communication with the discharge port of a respective one of said tanks for contolling the flow rate of the grain discharged from the discharge port of said respective one of said tanks;
   volumetric weight measuring means for measuring volumetric weights of the grains respectively fed to said tanks to generate volumetric weight signals respectively corresponding to the weights of the respective grains;
   computer means connected to said volumetric weight measuring means for receiving the respective volumetric weight signals therefrom to generate control signals respectively based on said volumetric weight signals;
   a plurality of drive means each drivingly connected to a respective one of said valve means and connected to said computer means, said drive means being respectively operative in response to the control signals from said computer means to respectively drive said valve means so as to allow the respective grains discharged by said valve means to be controlled in terms of weight unit; and
   mixing means for mixing the respective grains discharged from said valve means.

2. The grain mixing system according to claim 1, further comprising input means connected to said computer means for inputting to said computer means set values of the total weight and a mixture ratio of the grains respectively discharged by said valve means, said computer means supplying to said drive means, respectively, said control signals calculated on the basis of the volumetric weight signals from said volumetric weight measuring means and said set values of the total weight and the mixture ratio from said input means.

3. The grain mixing system according to claim 2, wherein each of said valve means includes a rotary valve, each of said control signals respectively supplied from said computer means to said drive means being representative of a total number of revolutions of the associated rotary valve.

4. The grain mixing system according to claim 3, wherein each of said drive means includes a pulse motor.

5. The grain mixing system according to claim 4, wherein said computer means comprises a memory connected thereto for storing data including at least the volumetric weights of the respective grains measured by said volumetric weight measuring means, the respective total numbers of revolution of said pulse motors and the total weight of grains respectively discharged by said rotary valves, said grain mixing system further comprising a display connected to the computer means for displaying said data and a printer connected to said computer means for printing said data.

6. The grain mixing system according to claim 1, further comprising input means connected to said computer means for inputting into said computer means set weight values per unit time of the respective grains discharged by said valve means, said computer means respectively supplying to said drive means said control signals calculated on the basis of the respective volumetric weight signals frm said volumetric weight measuring means and the respectively corresponding set weight values from said input means.

7. The grain mixing system according to claim 6, wherein each of said valve means includes a rotary valve, and each of said control signals respectively supplied to said drive means from said computer means is representative of a number of revolution per unit time of the associated rotary valve.

8. The grain mixing system according to claim 7, wherein each of said drive means includes a pulse motor.

9. The grain mixing system according to any one of the preceding claims 1 to 8, further comprising a plurality of storage tanks corresponding in number to the first-mentioned tanks, and means for respectively delivering the grains from said storage tanks to said first-mentioned tanks, said volumetric weight measuring means measuring the volumetric weights of the respective grains delivered from said storge tanks to said first-mentioned tanks.

10. The grain mixing system according to claim 9, wherein said mixing means comprising a mixing tank, means for delivering the grains respectively discharged by said valve means, and means for agitating and mixing the respective grains delivered into said mixing tank.

11. The grain mixing system according to claim 1, further comprising weighing means for measuring the weights of the respective grains fed to said tanks to input weight signals corresponding to the respective grains to said computer means, and said computer means respectively supplying to said drive means the control signals calculated on the basis of the weight signals from said weighing means and the respectively corresponding volumetric weight signals from said volumetric weight measuring means.

12. The grain mixing system according to claim 11, wherein each of said valve means includes a rotary valve, and each of the respective control signals supplied from said computer means to said drive means being representative of total number of revolutions of the associated rotary valve, required for discharging the entire grain contained in the associated tank.

13. The grain mixing system according to claim 12, wherein said computer means controls said drive means to cause the same to respectively drive said rotary valves such that said rotary valves are subsequently rotated with a predetermined time lag and said rotary valves are rotated by the respective set total numbers of revolution within the respective time duations which are the same as each other.

14. The grain mixing system according to claim 13, wherein each of said drive means includes a pulse motor.

15. The grain mixing system according to claim 14, wherein said mixing means comprises a mixing tank, means for delivering the grains respectively discharged by said valve means to said mixing tank, and means for agitating and mixing the grains delivered into said mixing tank.

16. The grain mixing system according to claim 15, further comprising a plurality of storage tanks corresponding in number to said first-mentioned tanks and means for respectively delivering the grains from said storage tanks to said first-mentioned tanks, said weighing means measuring the weights of the respective grains delivered from said storage tanks to said first-mentioned tanks.

17. The grain mixing system according to claim 16, wherein said computer means comprises a memory connected thereto for storing data including at least the volumetric weights of the respective grains measured by said volumetric weight measuring means, the respective total numbers of revolution of the pulse motors and weights of the respective grains measured by said weighing means, said grain mixing system further comprising a display connected to said computer means for displaying said data and a printer connected to said computer means for printing said data.

* * * * *